F. KRITZ.
TUBE WELDING MACHINE.
APPLICATION FILED NOV. 26, 1919.
1,363,326.
Patented Dec. 28, 1920.
6 SHEETS—SHEET 3.
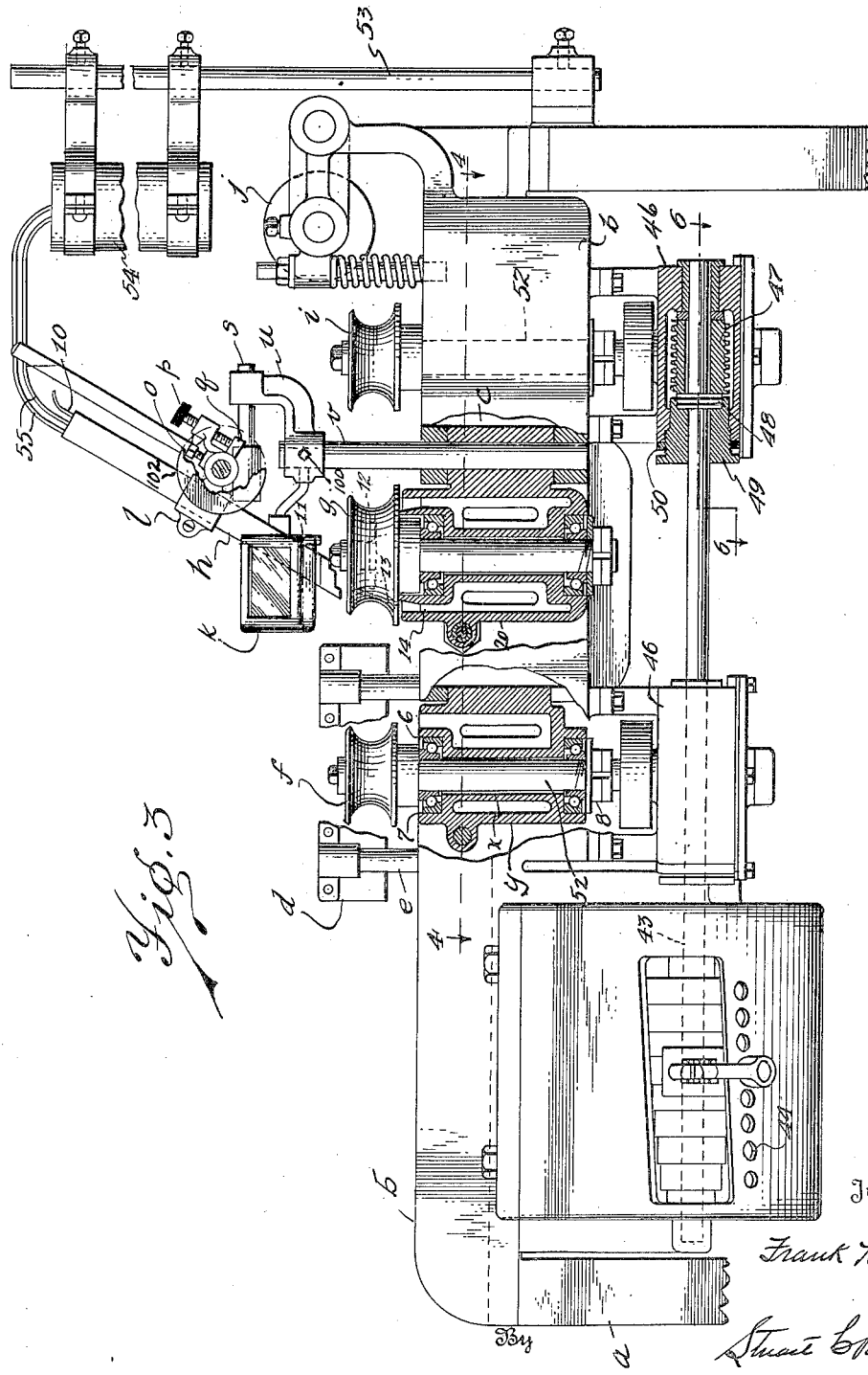

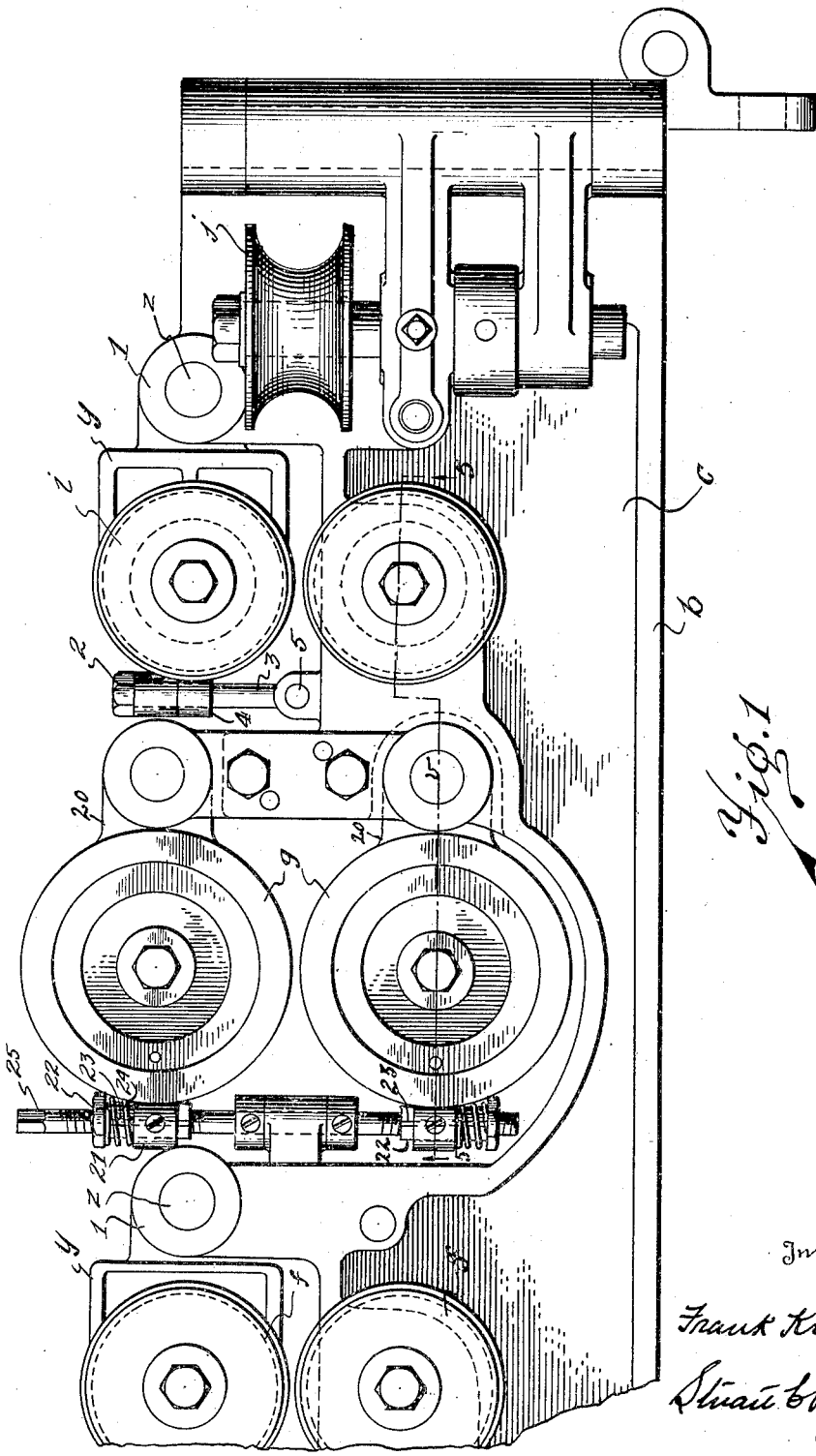

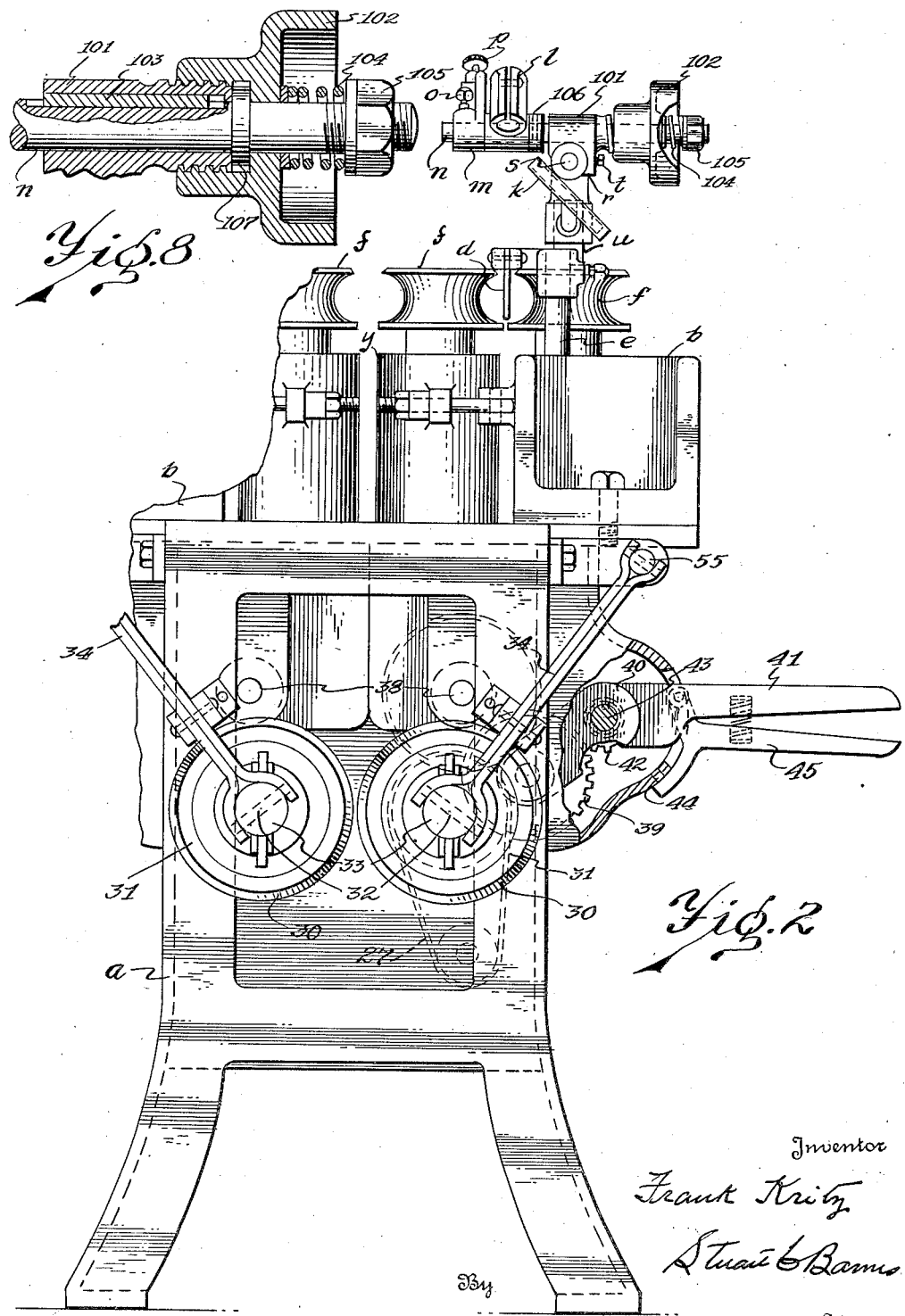

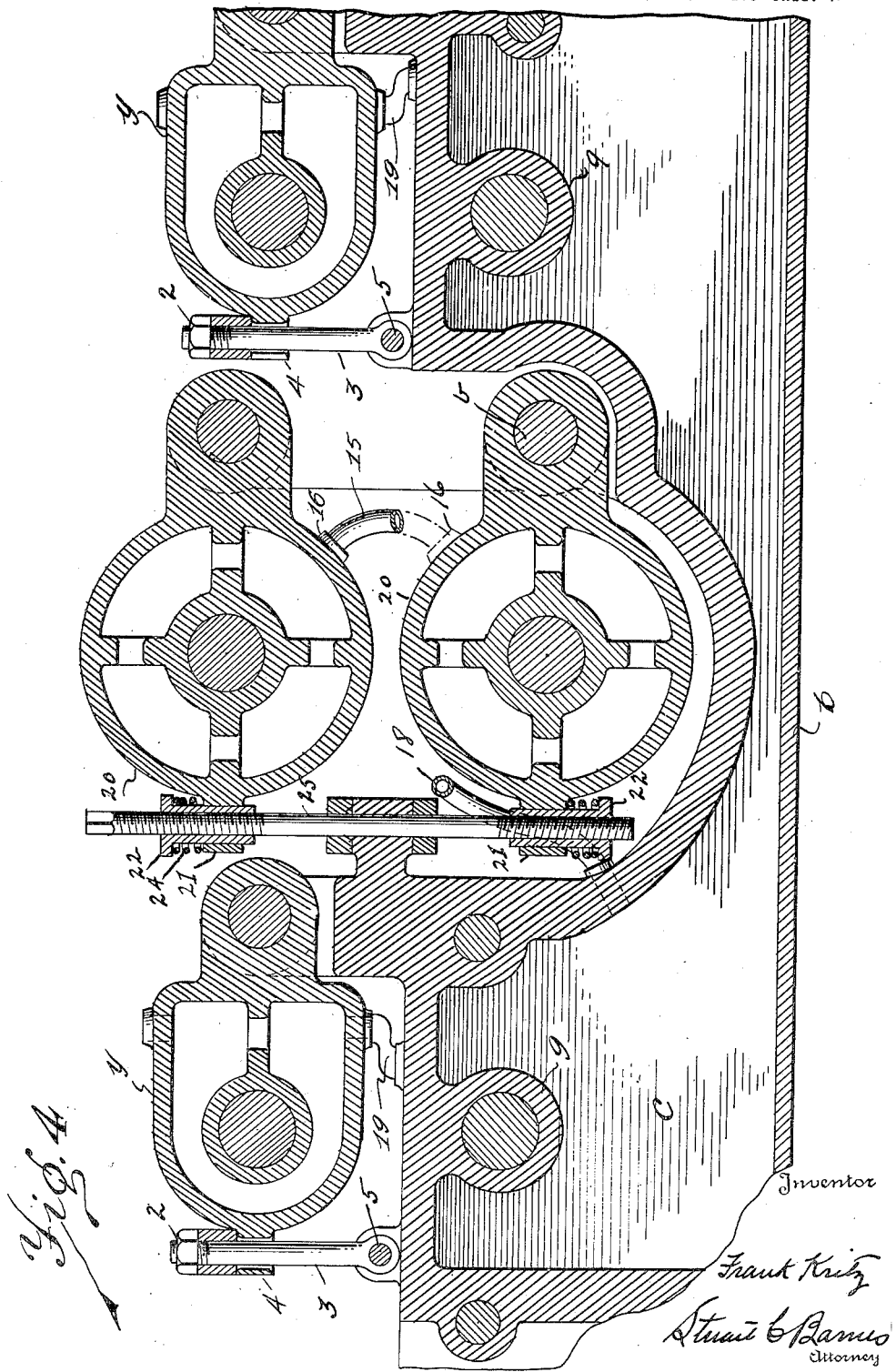

F. KRITZ.
TUBE WELDING MACHINE.
APPLICATION FILED NOV. 26, 1919.
1,363,326. Patented Dec. 28, 1920.
6 SHEETS—SHEET 5.
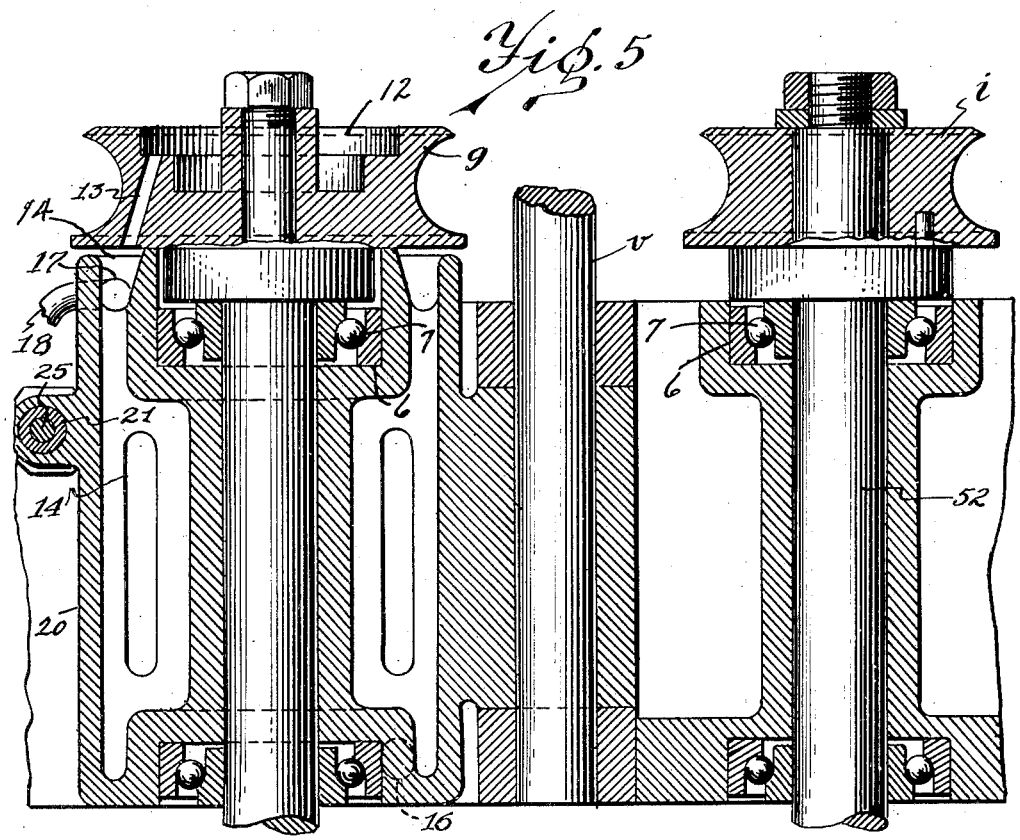
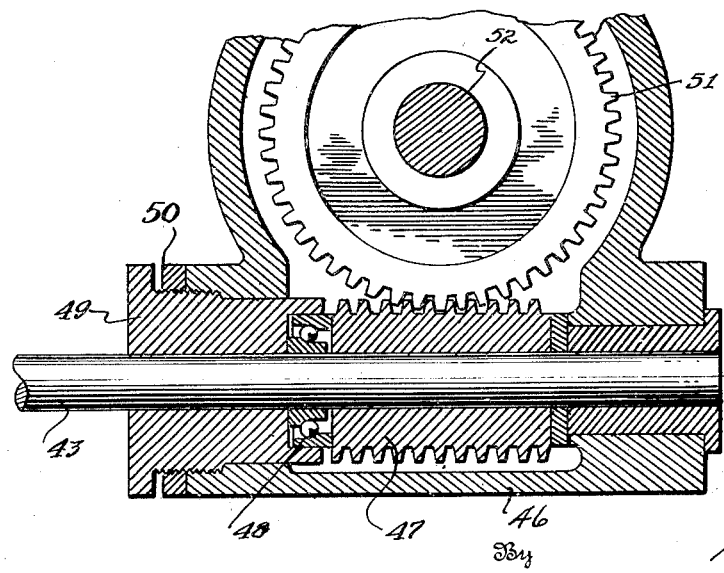

F. KRITZ.
TUBE WELDING MACHINE.
APPLICATION FILED NOV. 26, 1919.

1,363,326.

Patented Dec. 28, 1920.
6 SHEETS—SHEET 6.

Inventor
Frank Kritz
By Stuart C Barnes
Attorney

UNITED STATES PATENT OFFICE.

FRANK KRITZ, OF DETROIT, MICHIGAN.

TUBE-WELDING MACHINE.

1,363,326.  Specification of Letters Patent.  Patented Dec. 28, 1920.

Application filed November 26, 1919. Serial No. 340,757.

*To all whom it may concern:*

Be it known that I, FRANK KRITZ, a citizen of the United States, residing at Detroit, in the county of Wayne and State of Michigan, have invented certain new and useful Improvements in Tube-Welding Machines, of which the following is a specification.

This invention relates to tube welding machines. Tube welding machines are broadly old. The machine here to be described is an improvement upon tube welding machines in which improved swinging supports are afforded for the pressure rollers and in which a yielding engagement of some of the rollers with the tube is secured.

Another improvement is the design of the machine to afford suitable cooling of the rollers, which are greatly heated by the welding operation. These and other improvements will be best understood when the detailed description is given.

In the drawings,—

Figure 1 is a plan view of the rolls and the bed of the machine.

Fig. 2 is an end elevation of the machine, a few of the parts being in section.

Fig. 3 is a side elevation with some of the parts broken away.

Fig. 4 is a section taken on the line 4—4 of Fig. 3.

Fig. 5 is a vertical section taken on the line 5—5 of Fig. 1.

Fig. 6 is a section taken on the line 6—6 of Fig. 3.

Fig. 8 is a sectional detail of the torch mounting.

Figure 7:
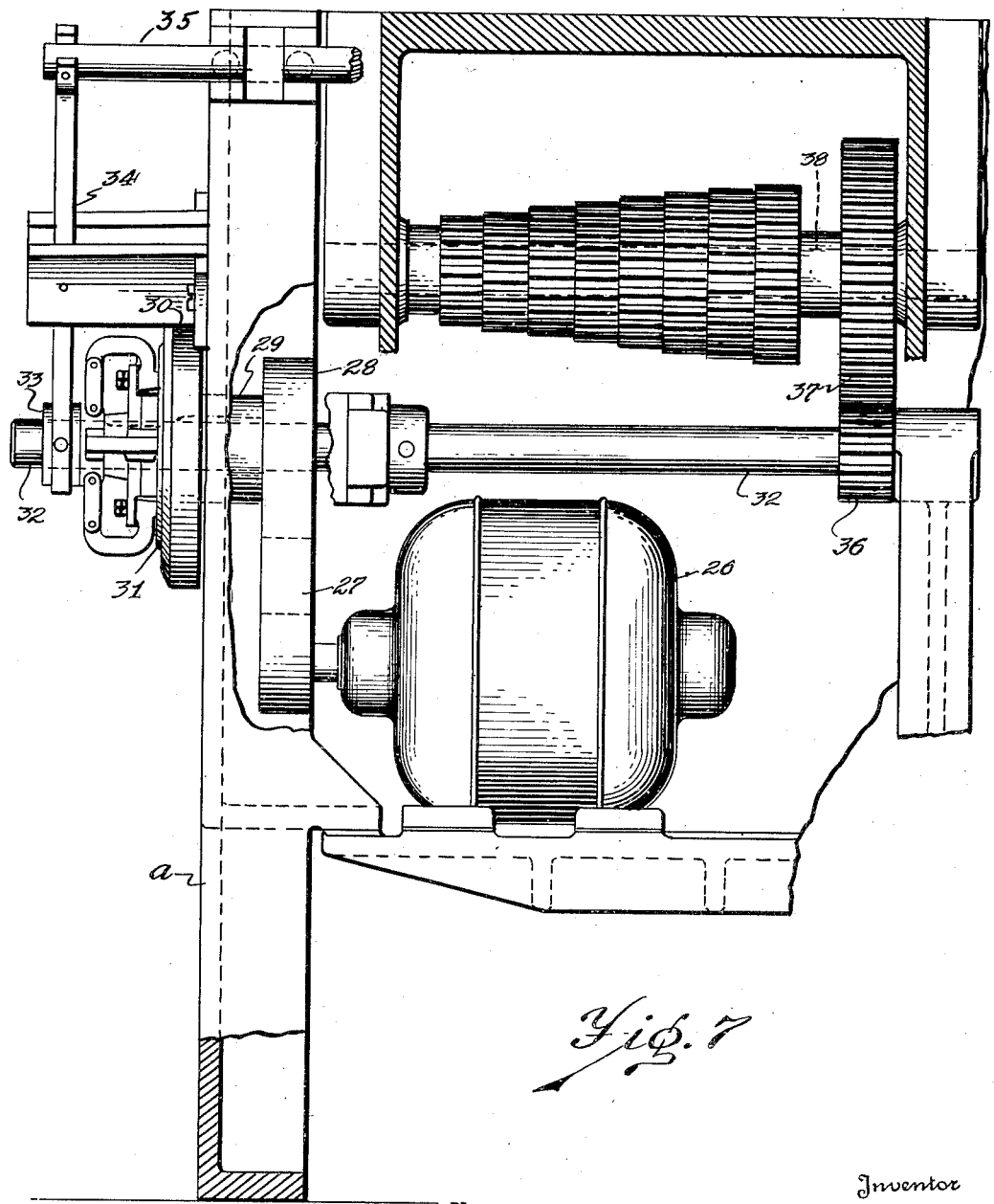
Fig. 7 is a detail of the left hand end of the machine shown in Fig. 3 showing the variable speed drive.

The machine comprises a stand $a$ on which is bolted a bed $b$, the right hand end of which is formed into an inclosure or tank $c$ (Fig. 1). The stand shown in Fig. 2 is a double stand capable of holding two tube-making units. The illustrations show completely only one unit while the broken portion shown in Fig. 2 indicates the possibility of two units on the one stand.

This is a machine for welding previously formed split tubing. The tubing is fed into the rolls here shown as three pair. A guiding fin $d$ supported on posts $e$ passes through the opening in the split tubing to prevent the twisting of the tubing. The first pair of rollers $f$ presses the edges of the split tubing toward each other, while the intermediate or second pair of rollers $g$ press the edges together directly under the oxy-acetylene welding torch $h$. The third pair of rollers $i$ continues the pressure on the tubing to prevent the newly formed weld from separating. $j$ designates a roller with a horizontal axis which holds the tubing down as it leaves the machine. $k$ is a colored glass holder to protect the operator's eyes. The torch $h$ (Fig. 3) is supported by a clip $l$. This clip is carried on a sleeve $m$ (Figs. 2 and 3) that is supported on the stub shaft $n$. By loosening the set screw $o$ and turning the thumb screw $p$ against the abutment $q$, the clip and sleeve may be caused to rock on the stub shaft $n$, thereby adjusting the tilt of the torch $h$. This stub shaft $n$ is in turn supported by a sleeve $r$ that is adjustable along the guide rod $s$ when the set screw $t$ is loosened. The guide rod $s$ is supported by the bracket $u$ carried on the post $v$ which is sunk in the bed of the machine. By loosening the set screw 100 the bracket $u$ may be adjusted up and down the post $v$.

Now referring to Figs. 2 and 8, it will be seen that the sleeve 101 in which the stub shaft $n$ is set is threaded on one end and that the nut 102 turns thereupon. The stub shaft $n$ is splined to the sleeve 101 by the key 103. Hence any turning of the nut counter-clockwise will through the spring 104 and nut 105 pull the shaft $n$ and the clip to the right until stopped by the collar 106 pinned to the shaft $n$. Turning of the nut in the opposite direction will shift the shaft $n$ to the left by reason of thrust upon the collar 107. The spring 104 serves as a lock nut arrangement to prevent accidental disturbance of adjustment.

Referring to Fig. 1, it will be seen that the rear roller of the first and third sets is supported upon a pivoted bearing. The bearing is formed by the roller shaft running down through a cored out passage $x$ (Fig. 3) of the cast iron tank $y$ that is supported on the post $z$ by the hub 1 so that it may swing on that post. Hence by turning the nut 2 on the end of the stem 3 that passes through the perforated lug 4, the outward separation of the rolls of a pair can be limited. The stem 3 is pivoted to the bed at 5. The tank $y$ is cast iron and cored out, as shown (Figs. 3 and 4), to allow a complete passage of water about the cored center passage which houses the roller shaft, In short, the tank water-jackets the roller shaft. The upper and lower portions of the cast iron water tank $y$ are cored out to form ball bearing seats 6 (Fig. 5) in which is held the ball bearing 7. A nut and washer 8 on the lower end of the threaded roller shaft (Fig. 3) serves to assemble the shaft and the bearing parts together in relation to the journal box formed by the adjoining portions of the cast iron tank $y$.

The same arrangement as is shown for the rear roller in pair $f$ is duplicated with the rear roller in pair $i$ and a very similar arrangement of cast iron tank (Fig. 5) is used for both rollers in pair $g$, as will be better appreciated by reference to Fig. 4. The forward roller shafts of the first and third pairs $f$ and $i$ are simply journaled in the journal boxes 9 that are part of the casting that forms the tank $c$ (Fig. 4). This journal box is about three-quarters surrounded by water.

The oxy-acetylene torch is water-jacketed in a way that is now familiar in the art and needs no specific illustration. A water pipe 10 (Fig. 3) leads into the torch jacket and the water drips out of the nozzle 11 onto both of the intermediate rollers $g$. These intermediate rollers being directly in the zone of the welding heat require considerable cooling. They are provided with a well 12 (Fig. 5) in the upper surface having an over-flow passage 13 that allows the water to escape into the jacket 14 of the intermediate roller bearings. The hose 15 (Fig. 4) connecting the orifices 16 at the bottoms of the intermediate tanks (Fig. 5) keeps the water in the two intermediate tanks at the same level. 17 (Fig. 5) designates an over-flow orifice in the forward intermediate tank that connects the hose 18 (Fig. 4) and discharges into the bottom of the main tank $c$. This serves as a source of water supply for the main tank $c$, while the tanks $y$ are joined to the main tank $c$ by the flexible hose couplings 19 (Fig. 4). Hence their water levels are maintained the same as the main tank.

It will be noticed that the intermediate pair of rollers is pivotally supported by the intermediate tanks 20 which are cored out at the center to form journal boxes and which are provided with lugs 21 (Fig. 1). Through each one of these lugs runs a nut 22 that is splined into the lug by the spline 23. The compression spring 24 engages against the collar of the nut. The threaded rod 25 has, at the rear, a right hand and, at the front, a left hand thread. By turning this crank-shaft clockwise the nuts are caused to separate, and by turning it counter-clockwise the nuts are caused to approach each other. This adjusts the possible separation of the two rolls and the compression springs 23 serve to press the rolls tightly to the work. This enables the intermediate rolls $g$ to follow any small irregularities in diameter of the tube.

The machine is driven by the mechanism at the left hand end of the stand (refer to Fig. 7). 26 designates the motor driving through the belt 27 the pulley 28 connected by the hub 29 with the clutch part 30. The clutch part 31 is splined on the shaft 32 so that when the two clutch parts are engaged the shaft and pulley drive together, and when they are disengaged, by shifting the clutch collar 33 with the fork 34, the power is disconnected from the shaft 32. The clutch fork 34 is operated by an actuating rod 35 that runs along the whole length of the machine. On the end of the drive shaft 32 is a driving pinion 36 that drives a very much larger gear 37 on the counter-shaft 38. This counter-shaft 38 is provided with a set of stepped gears numbering here eight. Now referring to Fig. 2, the form of change speed gears that is often used on a lathe will be seen. An intermediate idling gear 39 is carried on the arm 40 of the fork 41. This idling intermediate gear 39 is always in mesh with the pinion 42 of the worm shaft 43. This pinion is splined to the worm shaft and may be shifted by the fork 41 along the worm shaft 43 to bring the idling gear 39 into mesh with any one of the counter-shaft gears when desired, the arm 40 being rotated sufficiently to care for the variation of diameters of the counter-shaft gears. This turning of the arm to accommodate the variation in the counter-shaft gear diameters is effected by the placement of the detent holes 44 (Fig. 3) in a gradually rising line, the pin of the spring-set detent 45 engaging in the detent holes and properly placing the intermediate gear to accommodate the diameter of the adjacent counter-shaft gear.

The worm shaft 43 (Fig. 3) runs into a worm housing 46 which is bolted to the bed $b$ of the machine. The worm housing contains the worm 47, the thrust bearings 48, the thrust nut 49, and lock nut 50. Turning to Fig. 6, it will be seen that the worm 47 meshes with the spiral gear 51 which is secured to the roller shaft 52. This serves to drive the forward rolls of the first and third pairs of rolls $f$ and $i$ respectively. This is all that is necessary to advance the tubing. The other rolls are driven by the progress of the tubing.

The post 53 carries a flash-back tank 54 into which lead the acetylene gas and oxygen hose 55. This is to prevent the flame accidentally running back through the supply end and needs no further explanation as it is an old device.

What I claim is:

1. In a tube welding machine, the combination of a plurality of rolls for engaging the tubing, bearings pivotally supported for each of the rolls, and means for simultaneously causing the rolls to advance toward each other or separate from each other.

2. In a tube welding machine, the combination of a plurality of rolls for engaging the tubing including a fixed roll and an oppositely disposed pivotally supported roll, means for advancing the pivotally supported roll toward the fixed roll, a pair of pivotally supported rolls, and means for separating or drawing said pivotally supported rolls toward each other.

3. In a tube welding machine, a pair of pivotally supported rolls, pivotally supported bearings for carrying said rolls, nuts splined through the bearings, and a crank with oppositely directed threads for simultaneously spreading or drawing together the pivotally supported rolls.

4. In a tube welding machine, the combination of a pair of rolls, a pair of pivotally supported bearings for the rolls, nuts splined through the bearings, a crank with oppositely directed threads for engaging the nuts which have oppositely directed threads also, and springs between the splined nuts and the bearings for tending to thrust the rolls upon the tubing.

5. In a tube welding machine, a roll, a pivotally-supported bearing therefor, and means for advancing and allowing the withdrawal of the roll in the bearing, comprising a nut splined through a portion of the bearing and a rod having threads engaging the nut.

6. In a tube welding machine, the combination of a roll, and a pivotally-supported bearing therefor in the form of a roll shaft and a journal box having a water-jacket.

7. In a tube welding machine, a roll, and a movable bearing therefor, comprising a tank formed into a water space and a journal box.

8. In a tube welding machine, a roll, and a casting formed into a journal bearing for journaling the roll shaft, and a water-jacket for containing fluid to cool the roll.

9. In a tube welding machine, the combination of a stationary bed formed into a water tank and a stationary journal box, a roll having a shaft journaled therein, a water tank pivotally supported on the bed and containing a journal box and a water-jacket portion, and means for advancing the pivoted water tank toward the stationary tank to adjust the separation of the rolls.

10. In a tube welding machine, the combination of a stationary bed provided with a space forming a water tank and formed into a stationary journal box, a roller provided with a shaft journaled in the journal box, a second roller provided with a shaft, a pivoted water tank journaled on the second roller shaft and formed into a water jacket for cooling the same, a water coupling between the two tanks to keep their levels the same, and means for advancing the movable water tank toward the stationary tank to adjust the separation of the rolls.

11. In a tube welding machine, a casting provided with projecting ears perforated to receive a post, a post for pivotally supporting the said casting through the said ears, said casting formed near the center into a journal box and having a water jacket formation around the journal box, the other side of the casting from the ears forming a perforated lug, a threaded stem passing through the perforated lug, and means for bringing pressure on the lug to advance the casting.

12. In a tube welding machine, the combination of a water-jacketed torch provided with a drip opening and a roll located adjacent the torch and provided with a water well adapted to receive the fluid from the drip opening.

13. In a tube welding machine, the combination of a water-jacketed torch provided with a drip opening, a roll adjacent the torch provided with a water well and an overflow passage-way leading from the well.

14. In a tube welding machine, the combination of a water-jacketed torch provided with a drip opening, a roll adjacent the torch provided with a water well adapted to receive the drip from the drip opening, a water-jacketed journal box for the roller shaft, and a passage leading from the well through the roll and discharging into the jacket of the journal box.

15. In a tube welding machine, the combination of a water-jacketed torch provided with a drip opening, a roll adjacent thereto provided with a water well, a shaft for the roll, a water-jacketed journal box for the shaft, and an over-flow passage leading from the water well of the roll and discharging into the water-jacket about the journal box.

16. In a tube welding machine, the combination of a pair of rolls, and a torch holder comprising a post, a bracket adjustable vertically thereon, a guide rod secured to the bracket, a double sleeve member adjustable on the guide rod, a shaft adjustable in the sleeve member, and a torch-holding clip adjustably tiltable upon the shaft.

17. In a welding machine, the combination of a supporting member including a sleeve with a threaded portion on the outside of the sleeve, a shaft in splined relation with the sleeve and provided with a collar, a nut adapted to engage with the threads of the sleeve and thrust against the collar in one direction, and means on the shaft for taking the thrust of the nut in the opposite direction.

18. In a tube welding machine, the combination of a support including a sleeve having threads on a portion of the exterior, a shaft splined into the sleeve and provided with a collar, a nut adapted to engage the threads of the sleeve and thrust in one direction against the collar, a second nut or abutment on the end of the shaft, a spring interposed between the first nut and the abutment to take the thrust of the first nut in the opposite direction to that of the thrust upon the collar, and a torch-holding clip secured on the shaft.

19. In a tube welding machine, the combination of a support including a sleeve having threads thereon, a shaft splined in the sleeve, a nut running on the threads of the sleeve, means on the shaft for taking the thrust of the nut in either direction to move the shaft, and a torch-holding clip on the end of the shaft.

20. In a tube welding machine, the combination of a support including a sleeve having threads thereon, a shaft splined therethrough, a nut running on the threads of the sleeve, means on the shaft for taking the thrust of the nut in either direction to move the shaft, a rockable torch-holding clip supported on the shaft, and means for adjustably securing it in tilted adjustment.

In testimony whereof I affix my signature.

FRANK KRITZ.